United States Patent [19]

Bajer

[11] Patent Number: 5,052,458
[45] Date of Patent: Oct. 1, 1991

[54] LOW SPEED RADIAL TIRE FREE OF CORDED BELTS

[75] Inventor: Jacques J. Bajer, Grosse Pointe, Mich.

[73] Assignee: DICO Tire, Inc., Clinton, Tenn.

[21] Appl. No.: 467,382

[22] Filed: Jan. 18, 1990

Related U.S. Application Data

[63] Continuation-in-part of Ser. No. 279,644, Dec. 5, 1988, abandoned.

[51] Int. Cl.$^5$ .................. B60C 9/18; B60C 9/12
[52] U.S. Cl. .................... 152/532; 152/458; 152/526
[58] Field of Search ............ 152/526, 527, 531, 537, 152/532, 536, 458

[56] References Cited

U.S. PATENT DOCUMENTS

| 3,077,915 | 2/1968 | Weber | 152/458 |
|---|---|---|---|
| 3,133,583 | 5/1964 | Dobson | 152/531 |
| 3,315,722 | 4/1967 | Marzocchi et al. | 152/458 |
| 3,361,179 | 1/1968 | Denker | 152/458 |
| 3,570,574 | 3/1971 | Marker | 152/527 |
| 3,772,130 | 11/1973 | Marzocchi | 152/557 |
| 3,799,233 | 3/1974 | Cappa | 152/537 |
| 4,691,752 | 9/1987 | Kabe et al. | 152/537 |

FOREIGN PATENT DOCUMENTS 1067582 5/1967 United Kingdom ............... 152/532

Primary Examiner—Michael W. Ball
Assistant Examiner—Gregory J. Wilber
Attorney, Agent, or Firm—Spencer & Frank

[57] ABSTRACT

An improved tire such as a radial ply tire of the type including a radial carcass body ply or plies, side walls and a tread and further including at least one cordless belt assembly positioned and aligned on the outer or inner circumference of the radial carcass body ply or plies, or positioned on both sides of the radial carcass body ply or plies, including between the radial carcass and the tread, each cordless belt assembly consisting essentially of plural parallel, discontinuous, oriented fibers embedded in an elastomeric material, the fibers being oriented parallel to each other, the tire characterized by the absence of circumferential peripheral cords or other cords for restricting the periphery of the tire carcass against outward expansion, and the absence of corded belts on the shoulder of the radial carcass body ply or plies.

12 Claims, 1 Drawing Sheet

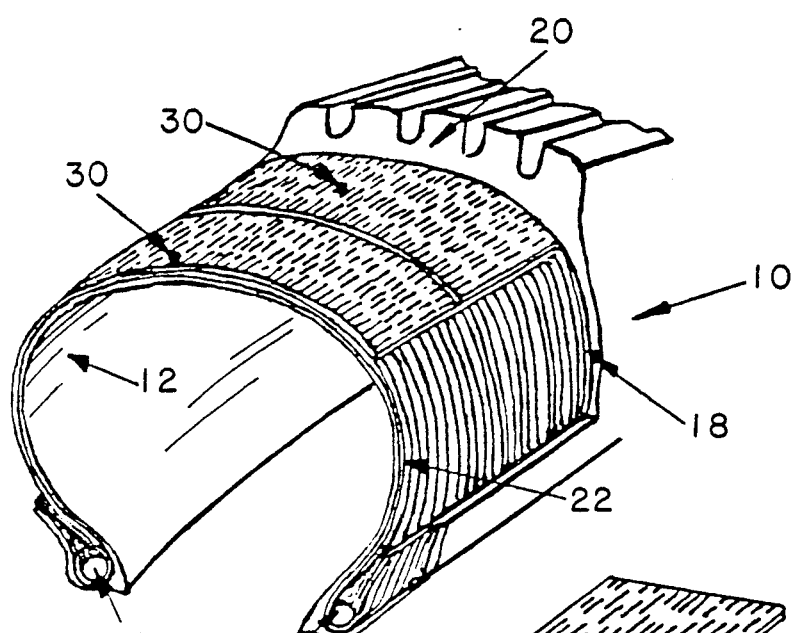
FIG. 1
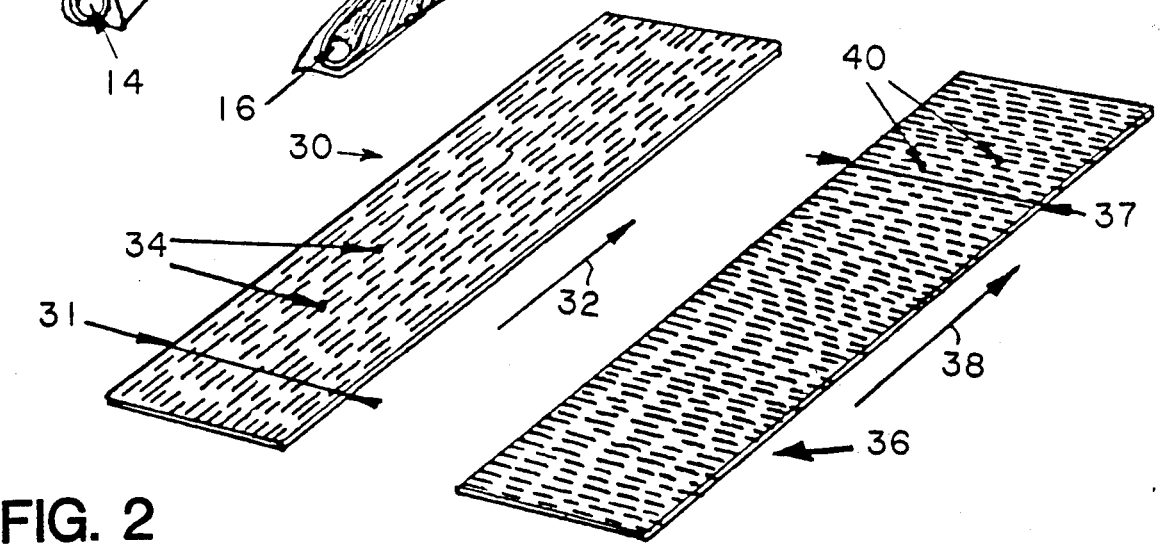
FIG. 2
FIG. 3

LOW SPEED RADIAL TIRE FREE OF CORDED BELTS

CROSS REFERENCE TO RELATED APPLICATION

This application is a continuation-in-part of my copending application Ser. No. 279,644, filed Dec. 5, 1988, now abandoned.

BACKGROUND OF THE INVENTION

The present invention relates to tire construction and manufacturing of pneumatic tires, in general, and more particularly, to an improved pneumatic tire structure characterized by reduced cost of materials and ease of manufacture and improved performance.

Pneumatic tires for vehicle wheels are, of course, well known. Among the popular styles of pneumatic tires which have gained commercial acceptance are bias tires and radial tires. In each of these tires, cords, usually made of rayon, nylon, polyester, steel, glass or aramid filaments, are imbedded in the elastomeric carcass of the tire. In the radial tire, the cords in the elastomeric tire carcass are disposed in side-by-side parallel position and extend from bead to bead over the crown of the tire at an angular relationship of approximately 90 degrees relative to the peripheral centerline of the tire carcass and may be thought of as being positioned as radial spokes when viewing the tire carcass from a side elevation position. In a bias tire, the cords in the tire carcass are also positioned in a side-byside parallel position, out at an angle of approximately 40 degrees relative to the peripheral centerline of the tire carcass although other angular relationships are contemplated when referring to a tire as a bias tire.

In either event the tire carcass is typically provided with one or more peripheral plies or belts around the outer circumference of the tire carcass. Particularly in the case of the radial ply tire, these plies or belts are formed of an elastomeric material also having side-by-side parallel cords embedded therein. The cords may be oriented perpendicular to the peripheral centerline of the tire or at an angle or bias to the peripheral centerline of the tire carcass outer circumference. The tire tread is positioned on top of these circumferential plies. Tires constructed in such manner fall into the category of restricted periphery tires.

Steel or textile cord belted radial tires have certain speed and performance characteristics which have made such tires extremely desirable for use on a variety of ground vehicles and aircraft. However, these speed and other performance characteristics are achieved at substantially higher costs not only for the raw materials used in the tire, but also in the tire manufacturing process. Thus the decision to use, for example, a steel cord belted radial tire on a particular vehicle and for a particular purpose, requires a balancing of cost with the performance characteristics which the tire is expected to achieve.

There are numerous specialty vehicles such as golf cars, lawn and garden tractors, vehicles or machines, riding lawn mowers, utility and recreational vehicles, all-terrain and off-the-road vehicles which do not require periphery restricted tires which provide the same speed and performance characteristics as for passenger cars, trucks and aircraft. In addition, these specialty vehicles weigh less than the other types of vehicles mentioned above. The periphery unrestricted tires which are the subject of this invention, which are the opposite of the conventional periphery restricted radial tires, feature reduced weight while still being fully safe and fully suitable for application on the specialty vehicles indicated above.

U.S. Pat. No. 3,570,573, to Marker, et al., issued in 1971, discloses a structural ply for a pneumatic tire, where the ply includes parallel, periphery continuous, restricting cords embedded in an elastomeric compound, in combination with uniformly dispersed, oriented short fibers also disposed in the elastomeric compound. Thus, the restricting ply or plies includes both cords and fibers. A distinction should now be made between "cord", "yarn" and "filament", as those terms are understood by those of ordinary skill in the art. Cords are understood in the tire industry structurally, as being made up of a series of continuous strands of material, with a strand, in turn, being a gathered plurality of continuous filaments. The filaments are wound or twisted together to form a strand, and the strands are twisted or cabled to form a cord. A filament is understood in the tire industry to refer to a single, individual fiber. (See, generally, the aforementioned U.S. Pat. at column 3, line 70, through column 4, line 4) Both the filament and the cord, of course, may be made of rayon, nylon, polyester, glass, cotton or metal.

U.S. Pat. No. 3,570,574, to Marker, et al., issued in 1971, also discloses a structural ply for a pneumatic tire where the peripheral plies or belts include cords and chopped fibers to restrict the tire carcass against peripheral expansion.

U.S. Pat. No. 3,570,575, to Marker et al. issued in 1971, also discloses circumferential plies where the elastomeric material includes both cords and filaments, again, with certain orientation of the cords and filaments described in the patent.

Canadian Patent 889,677 of Jan. 4th, 1972, illustrates and describes a pneumatic tire with peripheral plies formed of an elastomeric material have parallel, discontinuous cords embedded therein. The cords are oriented parallel to each other and parallel to the peripheral centerline of the tire.

U.S. Pat. No. 3 772,130, to Marzocchi, issued in 1973, also discloses a ply configuration which includes both cords and filaments, again with specific orientation of both cords and fibers as described therein.

U.S. Pat. No. 3,799,233, to Cappa, issued in 1974, illustrates a tire construction where it appears that both plies and breakers are provided, the breakers being of elastomeric material and including small oriented particles of a articular modulus of elasticity, such as glass, again oriented at a specific angle as described therein.

U.S. Pat. No. 3,918,506, to Marzocchi, issued in 1975, illustrates an improved tire construction including multiple plies, one of cords and the other of filaments, strands, yarn or cords.

Lastly, U.S. Pat. No. 4,067,372, to Masson, issued in 1978, illustrates the use of "shoulder" plies in addition to circumferential plies, the shoulder plies being an elastomeric material and including fibers therein.

Each of the above patents are incorporated by reference and the foregoing brief summary is not intended to be an exhaustive explanation of the teachings or variations described therein.

As may be appraciated from a brief review of these eight prior patents, the vehicle tires as described therein are all of the restricted periphery type and, consequently, to be called so, each typically requires peripheral cords, alone or with peripheral fibers, or circumferential plies and shoulder plies, or other expensive variations thereof to achieve tire carcass outer periphery restriction. Prior to the present invention, however, no attention has been paid to the particular vehicle operational requirements and to reducing the cost of manufacture of the specialty tire, such as the tire for a golf car, lawn or garden tractor, etc., by eliminating tire carcass peripheral restricting cords while still maintaining many of the benefits of the cord reinforced, radial restricted periphery belted tire.

SUMMARY OF THE INVENTION

The present invention is directed to an improved, lower-cost pneumatic tire having a particular utility as a specialty tire for applications on vehicles which are light, lightly loaded, do not operate at high speeds, and do not have to be steered, decelerated or accelerated severely, and do not require corded peripheral belt restriction but which retain many of the advantages of radial ply tire performance, while being substantially lighter in weight, less expensive in material cost, and easier to manufacture.

The radial pneumatic tire of the present invention provides peripheral plies that can be positioned over or under (or both over and under) the radial carcass body ply or plies, or between the radial carcass plies of the tire. These carcass peripheral plies are formed of an elastomeric material incorporating discontinues, parallel oriented short lengths of filaments embedded therein. The filaments are to be distinguished from the prior art use of cord. The tire construction according to the principles of the present invention is characterized by the absence of a need for peripheral restricting plies containing cords and by the absence of a need for shoulder plies containing cords.

Thus, the tire, according to the principles of the present invention, does not include cords in the peripheral plies or any other restrictions against peripheral expansion of the tire body which rather "grows" peripherally until an equilibrium state is achieved, while preventing the tire body cords from spreading under rolling loads.

According to the principles of the present invention, the filaments themselves are made of material typically used as filament material to construct yarns or cords, the filaments are short, discontinuous lengths oriented parallel to each other within the elastomeric ply matrix. The peripheral plies having such chopped filaments and no continuous peripheral cords do not restrict the periphery of the tire body against expansion.

BRIEF DESCRIPTION OF THE DRAWINGS

The foregoing objects, benefits and advantages of the present invention will become more apparent upon the reading the following detailed description of the invention taken in conjunction with the drawings.

In the drawings, wherein like reference numerals identify corresponding components:

FIG. 1 is a partial perspective view, with parts broken away and shown in section, of a pneumatic tire utilizing cordless belts or plies according to the principles of the present invention;

FIG. 2 is a perspective illustration of one form of a cordless ply according to the principles of the present invention; and FIG. 3 is a perspective illustration of a second form of a cordless ply according to the principles of the present invention.

DETAILED DESCRIPTION OF THE INVENTION

Referring to the drawings, FIG. 1 illustrates, diagrammatically, a radial tire 10 including a carcass or body 12 of generally inverted U-shaped configuration, as is conventional, with the carcass terminating in beads 14, 16. The radial tire includes sidewalls 18 (only one is illustrated) and a peripheral tread 20. The radial carcass, as is conventional, would be formed of an elastomeric ply material having a plurality of radial body ply cords 22 embedded in the elastomeric carcass ply material. As is well-known, the radial body cord ply or plies may be formed of nylon, rayon, polyestar, glass, cotton, aramid or metal. The description of the tire construction is general in nature and, therefore, is not intended to restrict or limit the scope of the present invention.

According to the principles of the present invention, means are provided for preventing only the radial body ply cords from spreading excessively when the tire rolls under load. That objective is accomplished, according to the present invention, through the use of one or more cordless belts or cordless plies 30 positioned o the circumferential periphery of the carcass over and/or under the carcass body ply or plies. FIG. 1 illustrates two such cordless belts 30 positioned over the radial carcass body ply 12 and under the tread 20. Again, these two cordless belts can be positioned under the radial carcass body ply 22, or in "over and under" combinations.

Referring next to FIG. 2, one cordless belt or cordless ply 30 is illustrated in greater detail. The belt consists of a thin, flat sheet having a width 31 and a longitudinal direction or length 32, and with filaments or fibers 34 oriented in the longitudinal direction 32. The belt is cut to a length sufficient to completely encircle the periphery of the tire radial carcass. Alternatively, a series of such belts may be placed end-to-end or overlapping to encircle the periphery of the radial carcass. The width 31 of the belt 30 is substantially less than the belt length, the width 31 being sufficient (but not restricted to) to generally cover the crown of the radial carcass from tread shoulder to tread shoulder.

The belt 30 is formed of an elastomeric material, and, for this purpose, any of the several types cf elastomers heretofore used in peripheral tire plies or belts may be utilized. Embedded within the belt 30 are a series of short discontinuous fibers 34. The fibers 34 are arranged in a plurality of parallel rows and the fibers in each row are oriented with their axes in the same direction. In the cordless belt illustrated in FIG. 2, the longitudinal axes of the discontinuous fibers are oriented parallel to the longitudinal axis direction of the belt. The term fiber refers to filaments which are not bundled together into cords, although the fibers may be formed of the same material heretofore used for cords and/or fibers, namely, nylon, rayon, polyester, cotton, metal, aramid or glass. There is no requirement that all the fibers in a belt be of the same material. The preferred material is chopped, oriented cotton fibers. The fibers may have a diameter of about 0.003 inches and a length up to about 0.50 inches. The dimensions are provided as being illustrative. The elastomeric material may be a synthetic rubber material, a natural rubber material or the like as heretofore used and the technique for embedding the fibers into the elastomeric material may be the same as that heretofore used for embedding cord in the elastomaric material. In this regard, reference should be had to the aforementioned Canadian Patent which describes techniques for forming an elastomer-cord belt; the same techniques may be used for forming the cordless elastomer-fiber belt of the present invention. The belt may be referred to as a cordless elastomeric matrix containing the fibers. The cordless belt or ply does not perform any carcass periphery restriction function as that phrase is understood in the tire art.

The cordless belt as manufactured according to the aforementioned description demonstrates tensile rigidity about an axis parallel to the axes of the fibers and flexibility about an axis perpendicular to the axes of the discontinuous, oriented fibers. By "tensile" rigidity, we refer to a resistance to elongation in a direction parallel to the axes of the fibers.

FIG. 3 illustrates a cordless belt 36 having a width 37 and a length or longitudinal direction 38. The belt 36 is formed of an elastomeric material and has embedded therein a series of oriented, short, discontinuous fibers 40, the fibers being oriented in a plurality of parallel rows with the longitudinal axes of the fibers parallel to each other. In the embodiment of FIG. 3, the axes of the fibers are perpendicular to the longitudinal direction or axis 38 of the belt. The cordless belt 36 of FIG. 3 is of sufficient length when positioned in its longitudinal direction 38 to completely encircle but not restrict the periphery of the radial carcass from natural expansion. A series of cordless belts may be positioned and aligned in the longitudinal direction to encircle but not peripherally restrict the radial carcass. The width 37 of the belt 36, in a direction parallel to the axes of the fibers, is again sufficient to cover the crown of the tire from tread shoulder to tread shoulder. The belt 36 of FIG. 3 demonstrates tensile rigidity about an axis parallel to the axes of the fibers (i.e., resistance across the width of the belt) and flexibility about an axis perpendicular to the axis of the fibers.

The radial tire of the present invention may include one or more cordless belts or plies 30, one or more cordless belts or plies 36, or combinations of cordless belts and plies 30 and 36 depending upon the belt strength and tire performance characteristics which may be desired. The relative flexibility and strength of the tire can be varied according to the principles of the present invention by varying the fiber density of the cordless belt or belts, by varying the fiber orientation, and by varying the hardness of the elastomeric compound forming the ply matrix, and by varying the type of fiber used in the cordless belt system. According to test results, the present invention provides certain surprising characteristics notwithstanding that the tire is characterized by the absence of carcass periphery restricting cords on the outer circumference of the tire radial carcass and by the absence of cords on the shoulders and crown of the tire radial carcass. Among the more important benefits for the specialty tire of the type described are ease of manufacture and lower raw material cost. The manufacturing process is similar to the one used to efficiently manufacture a conventional bias ply tire, whereby the raw tire components are assembled in one step on a tire assembling machine forming a cylindrical raw tire which will be shaped from its cylindrical form to a toroidal shell form by the tire molding and vulcanizing machine. Thus the manufacturing process is less expensive and less time consuming as compared to the multi-step assembling process used to assemble conventional radial tire components and the preshaping process required to form the radial tire raw assembly prior to proceeding with the molding and vulcanizing process for the conventional radial tire.

In addition, the radial tires manufactured according to the present invention have a substantially lower cost of raw materials and a lesser content of tire components as compared to conventional radial tires. The fibers, preferably cotton, are substantially less expensive than cords even when the cords are manufactured of cotton.

The radial tires according to the principles of the present invention demonstrate much improved road or terrain shock and vibration absorption and much less harshness and noise transmission as compared with conventional belted, periphery restricted radial tires which include peripheral cords and higher ground flotation. This is extremely important for the types of vehicles under consideration, and their operational characteristics, when contrasted to passenger cars and trucks. Furthermore, tires designed and manufactured according to the principles of the present invention generate equal or lesser rolling resistance as compared to conventional restricted periphery radial tires and thus vehicle fuel or electrical power consumption will be equal to or less than when the types of vehicle under consideration are equipped with restricted periphery radial tires which include peripheral cords in their belt system. Furthermore, when these vehicles under consideration are equipped with radial tires designed and manufactured according to the principles of the present invention, less vehicle roll-over will occur, while still maintaining good vehicle stability and directional control.

The foregoing is a complete description of the preferred embodiment of the present invention. Numerous changes and modifications may be made without departing from the spirit and scope of the present invention. The present invention, therefore, should be limited only by the following claims.

What is claimed is:

1. A low speed radial pneumatic tire comprising
   a radial carcass having body cords, opposed side walls, and a tread, and
   means for preventing the radial tire body cords from spreading excessively under rolling loads, said cord spreading prevention means consisting of at least one circumferential cordless belt positioned and aligned on the circumference of the tire carcass and in contact therewith, said cordless belt including an elastomeric matrix containing a plurality of discontinuous fibers, each of said fibers having a longitudinal axis, the fibers positioned in a plurality of rows and oriented such that the axes of the fibers are parallel to each other,
   said tire being free of corded belts.

2. The invention of claim 1 wherein said radial carcass body cord spreading prevention means includes at least two cordless belts positioned and aligned adjacent the carcass body ply, each cordless belt including an elastomeric matrix containing a plurality of discontinuous fibers, each of said fibers within each matrix having a longitudinal axis, the fibers within each matrix positioned in a plurality of rows and oriented such that the axes of the fibers within one matrix are parallel to each other.

3. The invention as defined in claim 2 wherein the axes of the fibers of the first belt are parallel to the axes of the fibers of the second belt.

4. The invention as defined in claim 2 wherein the axes of the fibers in the first belt are perpendicular to the axes of the fibers in the second belt.

5. The invention as defined in claim 1 wherein the axes of the fibers are parallel to the longitudinal axis of the belt.

6. The invention as defined in claim 1 wherein the axes of the fibers are perpendicular to the longitudinal axis of the belt.

7. The invention as defined in claim 1 wherein the fibers have a length up to about 0.5 inches.

8. The invention as defined in claim 1 wherein the fibers are chopped and oriented cotton.

9. The invention as defined in claim 1 wherein the fiber diameter does not exceed about 0.003 inches.

10. The invention as defined in claim 1 wherein the fiber is formed of a material selected from the group consisting of nylon, rayon, polyester, cotton, metal, aramid, or glass.

11. The invention as defined in claim 1 wherein the cordless belt is positioned over a radial ply tire carcass body.

12. The invention as defined in claim 1 wherein there are at least two cordless belts each of which is positioned over a radial ply carcass body.

* * * * *